(12) United States Patent
Michels et al.

(10) Patent No.: US 11,077,838 B2
(45) Date of Patent: Aug. 3, 2021

(54) TECHNIQUE FOR DETERMINING A WEAR VALVE, WHICH INDICATES WEAR OF A FRICTION LINING OF A VEHICLE BRAKE

(71) Applicant: ZF Active Safety GmbH, Koblenz (DE)

(72) Inventors: Erwin Michels, Kail (DE); Benedikt Ohlig, Vallendar (DE); Michael Bast, Bendorf-Sayn (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 142 days.

(21) Appl. No.: 16/437,786

(22) Filed: Jun. 11, 2019

(65) Prior Publication Data
US 2019/0381987 A1    Dec. 19, 2019

(30) Foreign Application Priority Data

Jun. 19, 2018  (DE) ........................ 102018004885.4

(51) Int. Cl.
*B60T 17/22*     (2006.01)
*F16D 55/226*    (2006.01)
(Continued)

(52) U.S. Cl.
CPC ............ *B60T 17/221* (2013.01); *B60T 1/065* (2013.01); *F16D 55/226* (2013.01);
(Continued)

(58) Field of Classification Search
CPC ...... B60T 17/221; B60T 1/065; B60T 13/741; B60T 15/043; B60T 8/1725;
(Continued)

(56) References Cited

U.S. PATENT DOCUMENTS 8,997,947 B2 *  4/2015  Shiraki ................ F16D 55/226
                                                  188/72.7
10,113,601 B2 * 10/2018 Masuda ................ B60T 13/741
(Continued)

FOREIGN PATENT DOCUMENTS

DE         10228115 A1    1/2004
DE       102004004992 A1  9/2005
(Continued)

OTHER PUBLICATIONS

Translation of German Patent No. DE 102011016126 obtained from website: https://worldwide.espacenet.com on Mar. 3, 2021.*
(Continued)

*Primary Examiner* — Pamela Rodriguez
(74) *Attorney, Agent, or Firm* — Robert James Harwood

(57) ABSTRACT

The present disclosure relates to a method for operating a vehicle brake system which includes the following steps: (1) determining a first wear value, which indicates wear of the friction lining of the vehicle brake, by taking into account at least one of the relevant parameters related to the operational history of the vehicle; (2) In dependence upon whether the first wear value meets a predetermined criterion, measuring the wear of the friction lining by moving the parking brake unit and by recording the curve of operating parameters of the parking brake unit while moving; (3) determining, based on the measurement, a second wear value, which indicates wear of the friction lining of the vehicle brake. The present disclosure also relates to a vehicle braking system, as well as a computer program and a control unit for implementing the method.

14 Claims, 5 Drawing Sheets

(51) Int. Cl.
  *B60T 1/06* (2006.01)
  *F16D 66/02* (2006.01)
  *F16D 65/18* (2006.01)
  *F16D 66/00* (2006.01)
  *F16D 121/24* (2012.01)
  *F16D 121/04* (2012.01)

(52) U.S. Cl.
  CPC ......... *F16D 65/183* (2013.01); *F16D 66/021* (2013.01); *F16D 66/022* (2013.01); *F16D 2066/006* (2013.01); *F16D 2121/04* (2013.01); *F16D 2121/24* (2013.01)

(58) Field of Classification Search
  CPC .... B60T 13/588; B60T 13/667; F16D 55/226; F16D 2121/24; F16D 66/022; F16D 65/183; F16D 66/021; F16D 2123/00; F16D 65/18; F16D 2121/04; F16D 2066/006
  See application file for complete search history.

(56) References Cited

U.S. PATENT DOCUMENTS

| | | | |
|---|---|---|---|
| 10,807,576 B2* | 10/2020 | Crum | B60T 8/175 |
| 10,933,848 B2* | 3/2021 | Bast | B60T 13/741 |
| 2020/0173508 A1* | 6/2020 | Michels | F16D 55/226 |

FOREIGN PATENT DOCUMENTS

| | | |
|---|---|---|
| DE | 10150803 B4 | 8/2008 |
| DE | 102011016126 A1 | 10/2012 |
| DE | 102016010823 A1 | 3/2018 |

OTHER PUBLICATIONS

Translation of German Patent No. DE 102016010823 obtained from website: https://worldwide.espacenet.com on Mar. 3, 2021.*

* cited by examiner

TECHNIQUE FOR DETERMINING A WEAR VALVE, WHICH INDICATES WEAR OF A FRICTION LINING OF A VEHICLE BRAKE

CROSS-REFERENCE TO RELATED APPLICATIONS

This application claims priority to German Patent Application No. 102018004885.4, filed 19 Jun. 2018, the disclosure of which is incorporated herein by reference in its entirety.

TECHNICAL FIELD

The present disclosure relates in general to the technical field of vehicle brake systems, comprising at least one vehicle brake. In particular, the present disclosure relates to vehicle brakes with a parking brake unit. More specifically, the present disclosure relates to a method for operating a vehicle brake system, which comprises at least a vehicle brake having a hydraulic service brake and a parking brake unit. By means of the present method, a wear value can be determined, which indicates wear of the friction lining of the vehicle brake. The present disclosure further relates to a vehicle brake system with a control unit for implementing such method, as well as a computer program product, and a control unit for it.

BACKGROUND

Vehicle brakes, comprising both a hydraulically actuated service brake as well as a parking brake unit, are known and are already widely used in vehicles. The service brake comprises a displaceable actuating piston, moved by the action of hydraulic pressure. When being in the operating position, the piston is supported typically against a friction lining, and presses against a rotor, such as a brake disc, coupled to the vehicle wheel. The hydraulic pressure can be applied by the driver, for example, according to a pedal operation. Furthermore, it is known that the hydraulic pressure is applied at least partially with additional electro-hydraulic components, independent of the driver, which may alternatively increase the pressure generated by the driver.

Likewise, in addition to the service brake it is known that parking brake units are included, which are intended to generate permanent braking forces, especially when the vehicle is at least temporarily in a stationary position (parking mode, hill hold assistance, etc). In general for this purpose, the parking brake unit can be designed to keep the actuating piston in a position to generate a braking force even after releasing the hydraulic pressure, and to lock the piston mechanically, in particular. Examples of such solutions can be found in DE 101 50 803 B4 and DE 10 2004 004992 A1.

It is also known that the braking system of a vehicle comprises a plurality of vehicle brakes described above, for example, one brake per wheel. In some cases, however, it is not necessary that each of the wheels of a vehicle be equipped with one of the aforementioned brakes, comprising both a hydraulic service brake and a parking brake unit. An adequate vehicle brake system for a vehicle with two axis may, for example, include two of the aforementioned brakes for the two wheels of the rear axis, and two brakes for the two wheels of the front axis, which comprise only one hydraulically actuated service brake, but no parking brake unit.

During the operation of the abovementioned brakes (with and without a parking brake unit) rubbing is produced, and thus wear of the friction lining of the respective brake occurs. In order to ensure a constant braking performance and in order not to affect the safety of the vehicle passengers, the friction lining is usually replaced when this material has reached a certain degree of wear. In the absence of accurate information on the actual degree of wear of the individual friction linings, for example, a regular change of the friction linings can be made at constant time intervals. Further, a degree of wear of the friction linings may be optically determined for regular maintenance of the vehicle and when a predetermined threshold of wear is exceeded (that is, the remaining thickness of the friction lining is below a predetermined threshold value), the respective friction lining is to be replaced. Furthermore, it is known that a wear indicator is provided in the vehicle, wherein a wear contact or warning contact is included for the respective friction linings, and wherein with the increasing wear of the friction lining, the electrical properties of the respective contact are altered. This alteration can be indicated by the illumination of a wall lamp.

However, the known methods for determining a wear value of the friction lining either lack accuracy or require an expensive and sometimes time-consuming measurement.

SUMMARY

The text below relates to a method for operating a vehicle brake system, and also a vehicle brake system, which enable to determine accurately and efficiently the wear value of the friction lining of a vehicle brake included in the vehicle brake system.

According to a first aspect, a method is provided for operating a vehicle brake system included in a vehicle, wherein the vehicle brake system comprises at least one vehicle brake. The vehicle brake comprises a service brake with an actuating piston, which, in order to generate a braking force by the action of a hydraulic pressure, is movable into an operating position, in which the actuating piston presses a friction lining against a rotatable brake disc. The vehicle brake also comprises a parking brake unit that is designed to apply a braking force acting on the brake disc, characterized in that it is supported against the actuating piston to press the friction lining against the brake disc. The method comprises the following steps: to determine a first wear value, which indicates wear of the friction lining of the vehicle brake, by taking into account at least one of the relevant parameters related to the operational history of the vehicle. In dependence upon whether the first wear value meets a predetermined criterion, to measure the wear of the friction lining by moving the parking brake unit and by recording the curve of operating parameters of the parking brake unit while moving. And to determine, based on the measurement, a second wear value, which indicates wear of the friction lining of the vehicle brake.

The service brake and the parking brake unit can be designed at least in mechanical terms according to generally known principles. In particular, as explained below, this may be a mechanical or an electromechanical parking brake unit. The movement of the parking brake unit can additionally be defined as movement of the unit as such, or movement of individual components only, and/or modules of the parking brake unit, while other components or modules can be designed as immobile elements. For example, the parking brake unit can include fixed elements coupled to the vehicle brake housing, and also movable elements, which can move over the mentioned motion ranges.

The vehicle brake system may be, for example, a vehicle brake system for a passenger car, wherein the vehicle brake system comprises two of the vehicle brakes described above, each comprising a hydraulic service brake and a parking brake unit. These two vehicle brakes can be mounted, for example, in the two wheels on the rear axis of the passenger car. For the two wheels of the front axis of the passenger car, a vehicle brake may be provided respectively, comprising only a hydraulic service brake, but no parking brake unit. In the abovementioned assembly it can be guaranteed that a hydraulic service brake will act on all wheels of the vehicle, although for the parking brake function it is sufficient if only the rear wheels of the passenger vehicle in idle state are mechanically locked.

The friction lining may comprise a first friction lining and a second friction lining, wherein the first friction lining and the second friction lining are arranged opposite each other, so that the brake disc between the first friction lining and the second friction lining is able to rotate, and then, in the operating position the disc is braked, since the first friction lining and the second friction lining press against the brake disc on both sides axially. According to the present disclosure the term friction lining can thus be considered as an umbrella term for the abovementioned first and second friction lining, if the first and second friction lining are not mentioned specifically.

In terms of the present disclosure wear value may be any information, which allows to draw a conclusion on the wear condition of the friction lining. In particular, this may be a numerical value. The numerical value may indicate, for example, wear of the respective friction lining in percent, thickness of the remaining friction lining (in centimeters or millimeters), thickness of the already worn friction lining (in centimeters or millimeters), or a numerical value in arbitrary units. The above applies to the first wear value, as well as to the second, the third and the fourth wear value, all of them discussed in the present disclosure.

Determining the first wear value can be made by taking into account at least one of the relevant parameters related to the operational history of the vehicle, on a purely mathematical basis, that is, without measuring the wear of the friction lining. In other words, here we can rely on parameters that are located, for example, in a memory of a control unit of the vehicle brake system. The parameter may thus be, for example, a parameter that was already registered during operation of the vehicle and then saved. Examples of such parameters are mentioned below. In other words, determining the first wear value represents an initial estimation of the actual wear of the friction lining.

"In dependence upon whether the first wear value meets a predetermined criterion" means, within the scope of the present disclosure, that an assessment is made as to whether the first wear value meets the predetermined criterion or not. If the predetermined criterion is met, the measurement of wear can be performed. This does not mean, however, that the measurement of wear must necessarily be carried out whenever the first wear value meets the predetermined criterion. One or more further assessments can take place, which is determined based on whether the measurement of the wear is performed or not. However, if the first wear value does not meet the predetermined criterion, then no measurement of wear of the friction lining is performed. The above applies accordingly to the formulation used below "in dependence upon whether the third wear value meets a predetermined criterion".

Performing the measurement of wear of the friction lining can be carried out, for example, according to a method which is described in the publication DE 10 2016 010 823 A1. The method outlined in this publication describes a method for determining a position of a support point of a vehicle brake on the basis of the curve of an operating parameter. The support point can in this case describe a position of the parking brake unit along the displacement of the parking brake unit, when a braking action is initiated by the parking brake unit, that is, when such unit begins to exert a braking force to the brake disc. As described in DE 10 2016 010 823 A1 the support point can be determined by the fact that a change in the curve of the operating parameter of the parking brake unit is detected while moving. In particular, the support point can be determined as a point of the first significant change in the curve of the motor current (example of an operating parameter). Performing the measurement can be carried out in a pressureless state or at a hydraulic pressure below a predetermined threshold value.

According to the present method, a position of a support point of the vehicle brake can also be determined, wherein the position of the support point, for example, directly represents the measurement of wear of the friction lining. The location of the support point can be, for example, specified on a linear scale, wherein the resulting value corresponds to the second wear value. Also, a zero point of the linear scale representing the position of the support point can be established as a position of a predetermined reference point of the vehicle brake, relative to which the parking brake unit moves. A zero point of the linear scale can, for example, also be determined as a position of the support point, wherein, at this point, the friction lining has not yet suffered wear (for example, new state of a vehicle or immediately after a new friction lining was mounted). The measurement of wear of the friction lining can thus determine a distance between the currently measured support point to one of the aforementioned zero points. This distance (for example, in millimeters or centimeters) may correspond to the second wear value.

The thus determined second wear value can be stored, for example, in a memory of a control unit of the vehicle brake system. This measured value may be included in the memory, for example, with a time stamp.

The predetermined criterion of the first wear value may involve an assessment as to whether the first wear value is above a predetermined threshold. If the first wear value indicates, for example, a wear in percent (0% means no wear), then the predetermined criterion may involve an assessment as to whether the first wear value exceeds a predetermined wear (in percent).

The method may further comprise: to determine a third wear value, which indicates wear of the friction lining of the vehicle brake, by identifying an overall elasticity of the vehicle brake; and in dependence upon whether the third wear value meets a predetermined criterion, to perform the measurement of wear.

Determining the third wear value will take place prior to performing the measurement of wear. However, determining the third wear value can take place prior to or after determining the first wear value. The described method thus follows a progressive process, wherein initially two wear values are determined (namely, the first wear value, and the third wear value), and only then, when both the first wear value and the third wear value meet a predetermined criterion respectively, the measurement of the wear will be performed. The third wear value is determined by identifying an overall elasticity of the vehicle brake. In other words, the identification of the third wear value occurs by determining an overall stiffness of the vehicle brake. The identification of the third wear value can be carried out according to a method described in the publication DE 10 2011 016 126. In particular, identifying the third wear value may include the following steps: to record a first parameter, which refers to the actuation path that an actuating element of the brake actuator covers, with translational movement during the operation process; to record a second parameter which refers to the actuating force applied to a wheel brake during the operation process; and to determine the wear condition (i.e., the third wear value) from the first and second parameters. The wear condition may in this case be determined from the stiffness of the wheel brake by calculating the quotient, based on the first and second parameters. A unit of the third wear value may for example correspond to a unit of the first wear value. This allows the first wear value to be compared with the third wear value.

The predetermined criterion of the third wear value may involve an assessment as to whether the third wear value is above a predetermined threshold. This can ensure that the measurement of the wear value will be carried out only when both the determination of the first wear value and the determination of the third wear value each exceed a predetermined threshold. In other words, the measurement of the wear value and thus the determination of the fourth wear value can only be carried out if already the first wear value and the third wear value indicate that the friction lining is worn to a predetermined degree.

The step of determining the third wear value can be performed after the step of determining the first wear value, in dependence upon whether the first wear value meets the predetermined criterion. This procedure corresponds to the above-described progressive process. If the first wear value does not meet the predetermined criterion, for example, the step of determining the third wear value is not performed. In this way, this can guarantee that the third wear value, which is determined by identifying an overall elasticity of the vehicle brake, then must only be determined if the identification of the first wear value suggests that the actual wear of the friction lining might be critical (i.e., above a predetermined threshold value).

As an alternative to the progressive assessment described above, a joint assessment of the first wear value and the third wear value can also be carried out, by taking into account two independent threshold values. For instance, it is possible to use the criterion according to which the sum of the first wear value and the third wear value will be above a predetermined threshold value. If this criterion is met, the measurement of the wear is performed, otherwise it is not.

The method may also include determining at least one fourth wear value of a further vehicle brake of the vehicle brake system based on the second wear value of the vehicle brake.

For this purpose, for example, a mathematical model may be used, wherein the second wear value will represent an input parameter for the mathematical model. In a simple case, the fourth wear value can be determined, for example, by multiplying the second wear value by a predetermined factor. The predetermined factor can be set by appropriate calibration or by empirical values.

A further vehicle brake may be a vehicle brake without a parking brake unit. The further vehicle brake of the vehicle brake system, for example, to be more precise, may be a vehicle brake, which although has a hydraulically operated service brake, does not include a parking brake unit. In other words, the second wear value can be determined, for example, for a vehicle brake of the rear axis of a vehicle, wherein the fourth wear value for a vehicle brake of the front axis will be estimated, on the basis of the second wear value using a mathematical model. Thus, a (fourth) wear value can also be determined for vehicle brakes, which do not include a parking brake unit for measuring the wear.

Performing the measurement of wear may include identifying a position of a support point of the parking brake unit by detecting a change in the operating parameter. Details have already been described above and are explained in detail in DE 10 2016 010 823 A1.

The parking brake unit may comprise an electromotive drive unit and an actuator unit interacting with the actuating piston, wherein the electromotive drive unit is designed to move the actuator unit in order to press the friction lining against the brake disc, and wherein the operating parameter of the parking brake unit comprises a motor current of the electromotive drive unit and/or a rotational speed of the electromotive drive unit.

Thus, a position of a support point can be determined, for example, by a change of the motor current and/or the rotational speed of the electromotive drive unit.

Determining the first wear value may include a calculation based on a mathematical model, wherein the parameters relating to the operational history of the vehicle are taken into account in the mathematical model. More precisely, the determination of the first wear value can be performed on the basis of a purely mathematical model, since for this determination no extra measurement is necessary. In fact, the parameters that (already) are stored in a memory of a control unit of the vehicle brake system can be used.

The parameter relating to the operational history of the vehicle in question may comprise one of the following parameters at least: total sum of the distance traveled by the vehicle; sum of the distance of the vehicle since the last change of the friction lining; elapsed time since the initial operation of the vehicle braking system; elapsed time since the last change of the friction lining; operating period of the vehicle since the initial operation of the vehicle; operating period of the vehicle since the last change of the friction lining; number of past braking processes; number of past braking processes since the last change of the friction lining; applied force of the past braking processes; and environmental conditions of the vehicle, such as outside temperature.

The total sum of the distance traveled by the vehicle may generally provide any indication, which allows to conclude the extent of the driving operation and the associated stresses on the vehicle. The operating period of the vehicle may be related to the accumulated time during which the vehicle is in running order, for example, the accumulated time with the ignition switched on and/or engine running. Furthermore, several of the above parameters can be included while determining the first wear value. Determining the first wear value, for example, may directly involve determining the sum of the driven distance of the vehicle since the last change of the friction lining, since the predetermined criterion for the first wear value only provides an assessment as to whether this value is above or below a predetermined threshold value related to the sum of the distance traveled.

In dependence upon whether the second wear value meets a predetermined criterion, the method may further comprise providing notice to the driver of the vehicle, who will be advised that changing a brake lining is required. This notice can occur for example by means of a human-machine interface, for example, in an optical and/or acoustic manner. For instance, the notice may occur, for example, by illumination of a warning light.

The method steps may be carried out or at least initiated, either individually or as a whole, by a control system of the vehicle brake system, which may be available in particular in the form of an electronic control unit. Such unit may also be integrated into or connected to a central control unit of the vehicle, in a generally known manner.

According to a second aspect, a vehicle braking system is provided for a vehicle. The vehicle braking system comprises at least one vehicle brake. The vehicle brake comprises a service brake with a friction lining and an actuating piston which, in order to generate a braking force under the action of a hydraulic pressure, is movable into an operating position, in which the actuating piston presses the friction lining against a rotatable brake disc of the vehicle. The vehicle brake also comprises a parking brake unit that is designed to apply a braking force acting on the brake disc, so that the disc is supported against the actuating piston to press the friction lining against the brake disc. Also, the vehicle brake system comprises a control unit, which is set up to enable the execution of a method involving the steps according to the first aspect.

With regard to the first aspect, all of the above-described configurations of the method can be applied to the vehicle brake system of the second aspect. In other words, the vehicle braking system may be set up to put all the aforementioned details of the first aspect into effect. Both the vehicle and the brake disc of the vehicle are not necessarily subject matter of the vehicle brake system according to the second aspect, although the description of the second aspect makes reference to the vehicle and the brake disc by means of a linguistic explanation of the characteristics of the second aspect.

According to a third aspect, a computer program product is provided. The computer program product comprises a program code device, in order to perform a method with the steps according to the first aspect, through the execution of a computer program product on a processor. With regard to the first aspect, all of the above-described configurations of the method can be applied to the computer program product of the third aspect.

According to a fourth aspect, a control unit is provided. The control unit comprises a processor and the computer program product according to the third aspect.

BRIEF DESCRIPTION OF THE DRAWINGS

Further features and advantages of the invention will be evident from the following description of a preferred embodiment with reference to the drawings, wherein.

Like reference numerals refer to like parts throughout the description of several views of the drawings.

DETAILED DESCRIPTION

Figure 1:
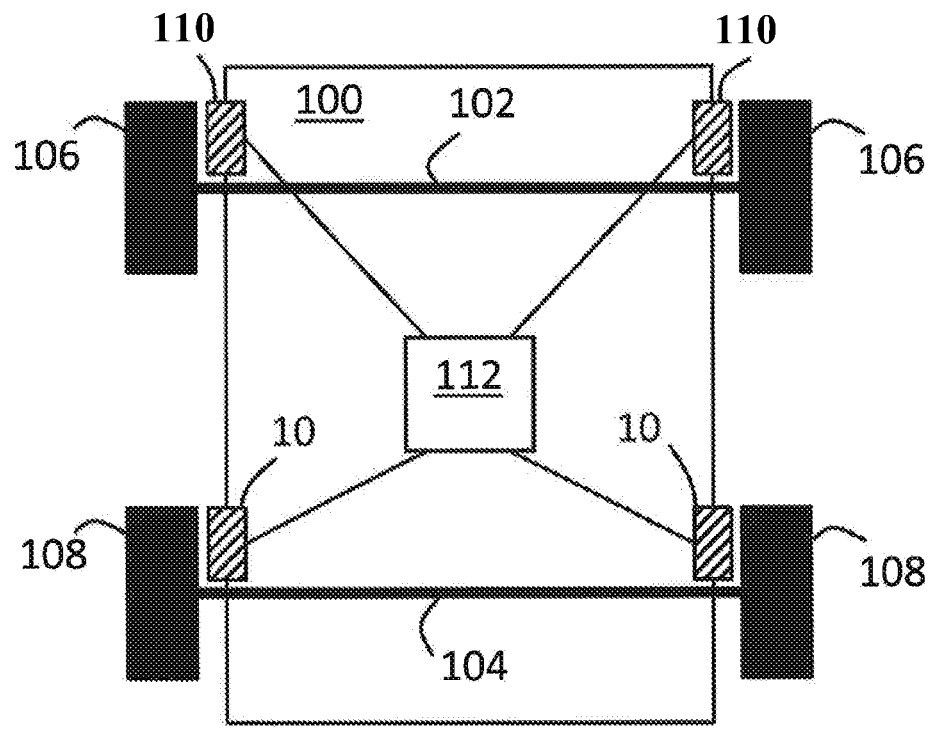
FIG. 1 is a schematic plan view of a vehicle having two axes, in which a vehicle braking system is arranged according to an embodiment.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It s also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a schematic plan view of a vehicle 100, in which a vehicle braking system is arranged according to an embodiment. The vehicle 100 comprises a front axis 102 and a rear axis 104, into which two wheels are arranged respectively, in particular, front wheels 106 and rear wheels 108. Furthermore, a brake disc (not shown herein) is provided for each of the wheels 106, 108, which is mechanically coupled to the respective wheel 106, 108, and mounted rotatably on it. During the braking operation performed by a brake disc of the vehicle braking system presented herein, the corresponding wheel 106, 108 is braked in a known manner.

The vehicle braking system shown in FIG. 1 comprises a vehicle brake 110 for each of the front wheels 106, and a vehicle brake 10 for each of the rear wheels 108. The vehicle brakes 10, 110 each comprise, in a known manner, a hydraulically operated service brake, which, upon actuation of a brake pedal during operation of the vehicle 100, is constructed to brake the respective disc brake and thus, the respective wheel 106, 108. In addition, the vehicle brakes 10 of the rear wheels 108 comprise a parking brake unit for performing a parking brake function. Details of the vehicle brake 10 are described below in connection with FIG. 4.

The vehicle braking system of FIG. 1 further comprises a control unit 111 The control unit 112 comprises a processor and a memory and is set up to perform one of the methods described herein, in order to operate a vehicle braking system or to determine a wear value. For this purpose, the corresponding instructions are stored in the memory of the control unit 112, which cause the processor of the control unit 112 to perform one of the methods described herein. The control unit 112 may, for example, be a central control unit of the vehicle 100, which also serves to control further functions of the vehicle 100. Furthermore, the control unit 112 may also be a separate control unit of the vehicle brake system.

Although FIG. 1 shows a vehicle 100 with four wheels 106, 108 and thus, with four vehicle brakes 10, 110, the present disclosure is not limited thereto, and a vehicle brake system according to the present disclosure may include, for example, further vehicle brakes with or without a parking brake unit for further wheels of a further axis of the vehicle 100. In a simple case, a vehicle brake system comprises only the control unit 112 and a vehicle brake 10.

Figure 2:
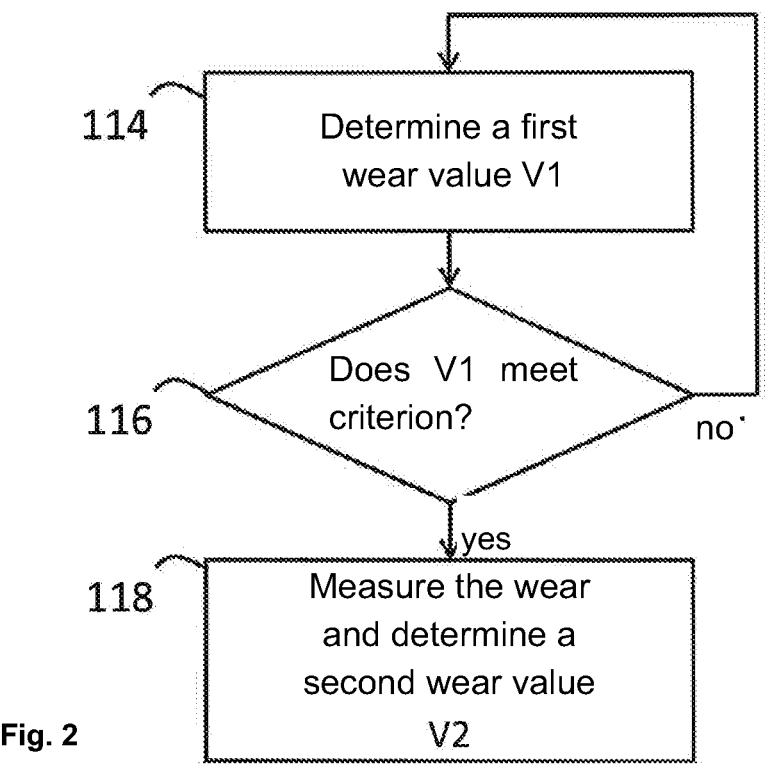
FIG. 2 is a process diagram of a method for operating a vehicle braking system according to a first embodiment.

FIG. 2 shows a process diagram of a method for operating a vehicle brake system or for determining a wear value according to a first embodiment. The vehicle braking system may, for example, be the vehicle braking system of FIG. 1 shown above, wherein the method is carried out by the control unit 112. Generally, the method of FIG. 2 is carried out by a control unit of a vehicle braking system. The method of FIG. 2 is used for example to determine a wear value of a friction lining of one of the vehicle brakes 10. Hereafter, the method is described for only one of the vehicle brakes 10, since the method can also be performed for both vehicle brakes 10 of the rear wheels 108.

In a first step 114 of the method, a first wear value V1 is determined by taking into account at least one parameter. Here, the first wear value V1 indicates the wear of the friction lining of the vehicle brake 10. This parameter is a parameter that refers to the operational history of the vehicle 100. For instance, the parameter may be a sum of the distance traveled by the motor vehicle 100 since the last change of the friction lining of the vehicle brake 10. This parameter can be obtained in a simple manner, as the vehicle 100 registers the distance traveled anyway, and stores it in a memory of the control unit 112 of the vehicle 100. Further parameters may consider a number of braking operations and/or operating period of the vehicle 100, wherein a combination of the above parameters is possible to determine the first wear value.

The first wear value V1 indicates wear of the friction lining of the vehicle brake 10, as far as the value either directly or indirectly provides information about the wear of the friction lining. Thus, the first wear value V1 may directly indicate a wear of the friction lining, for example, in percent or in millimeters (residual or already worn friction lining). In a very simple case, even the observed parameter, such as, for example, the sum of the distance traveled by the motor vehicle 100 since the last change of the friction lining, indirectly represents the first wear value V1.

In a second step 116 an assessment is made as to whether the first wear value V1 meets a predetermined criterion. In other words, an assessment is made as to whether the first wear value V1 indicates that the wear of the friction lining of the vehicle brake 10 is already above a predetermined threshold value. Here, the assessment may comprise a simple threshold value analysis, wherein it is assessed whether the first wear value V1 is above a predetermined threshold value S1 (V1>S1?). If the criterion for the first wear value V1 is met, the method continues at step 118. If the criterion is not met, the method is terminated or it can (if required, after the end of a predetermined period of time or after the occurrence of a predetermined event) start again at step 114.

In step 118, a measurement of wear of the friction lining of the vehicle brake 10 is performed. In this case, the parking brake unit is moved, and a history of an operating parameter of the parking brake unit is registered while moving. Details of this measurement are described below in connection with FIGS. 5-8. By measuring the wear, a second wear value V2 is determined, which indicates wear of the friction lining of the vehicle brake 10. Since the second wear value V2 is an exact measuring value, it can be assumed that this second wear value is more reliable than the first wear value V1, according to the estimation in step 114.

If more than one vehicle brake 10 is provided (such as in the above example of FIG. 1), then the measurement of wear of the friction linings for each of the existing vehicle brakes 10 can be performed in step 118.

The wear value V2 can now be stored for further purposes, for example, in the memory of the control unit 112. Further, the second wear value V2 can be notified to a driver of the vehicle 100. An assessment can also be made as to whether the second wear value is above a predetermined second threshold value S2 (V2>S2?) and if this is the case, a warning can be issued to the driver of the vehicle 100, which will inform that the brake lining of the respective vehicle brake 10 is to be replaced.

Figure 3:
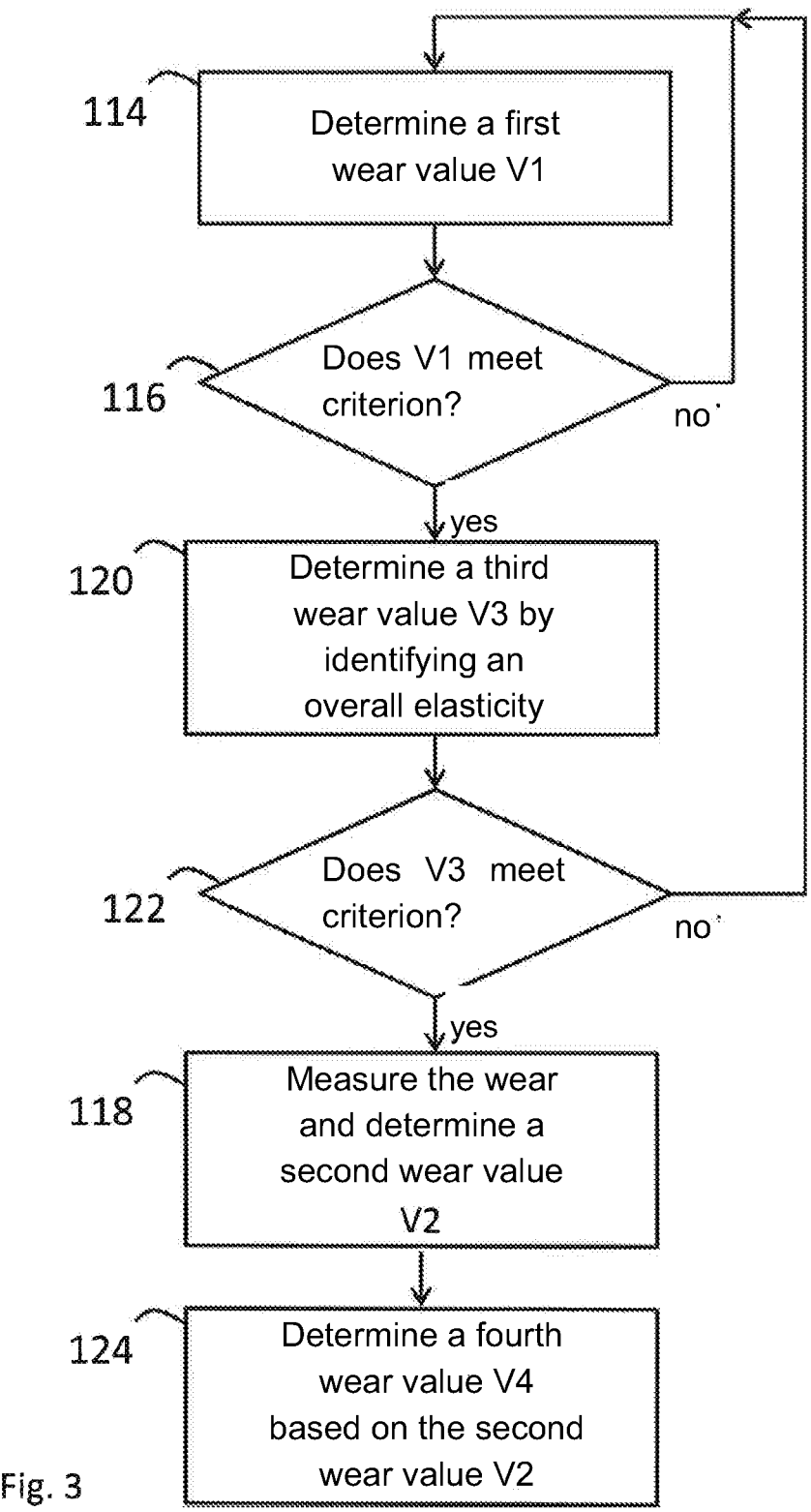
FIG. 3 is a process diagram of a method for operating a vehicle braking system according to a second embodiment.

FIG. 3 shows a process diagram of a method for operating a vehicle braking system or for determining a wear value according to a second embodiment. The method of the second embodiment comprises all the steps of the method according to the first embodiment of FIG. 2 (steps 114, 116 and 118). For this reason, only the differences of the method of the second embodiment with respect to the method of the first embodiment are described below, since the similarities are included in the first embodiment mentioned above. The method shown in FIG. 3 comprises an additional intermediate step 120 and an additional assessment 122 between the steps 116 and 118 of the method. In other words, after the assessment is made in step 116 the measurement is not immediately carried out according to step 118, but first a third wear value V3 is determined according to step 120.

In step 120, a third wear value V3 is determined, which indicates wear of the friction lining of the vehicle brake 10, by determining an overall elasticity of the vehicle brake 10. The determination of the third wear value V3 is carried out according to the method described in the publication DE 10 2011 016 126. In other words, the third wear value is determined by identifying the overall stiffness of the vehicle brake 10. Since in this case the overall stiffness of the vehicle brake 10 is measured, determining the wear according to step 120 involves (an indirect) measurement of the third wear value, which already provides a more accurate indication of the actual wear of the friction lining than the estimation in step 114. Thus, the method of FIG. 3 describes a progressive process comprising multiple estimations, or rather measurements of the wear value.

In step 122, an assessment is made as to whether the third wear value V3 meets a predetermined criterion. This assessment is analogous to the assessment in step 116, where a different criterion may be required though, (for example, a different threshold value S3) than the one used according to step 116. If the criterion is met in step 122, then the method continues with step 118, already described above. If not, then the method is terminated or it commences again (possibly after termination of a predetermined period of time) at step 114.

The method according to the second embodiment of FIG. 3 further comprises the optional step 124. This step is optional and can thus be omitted in some embodiments. Furthermore, this step 124 can also be carried out according to the step 118 of the method of the first embodiment in FIG. 2.

In step 124, a fourth wear value V4 is determined based on the second wear value V2. The fourth wear value V4 refers to a wear value of a further vehicle brake of the vehicle brake system. In the embodiment described herein, the further vehicle brake refers to one of the vehicle brakes 110 of the front axis 102 of the vehicle 100 of FIG. 1. These vehicle brakes 110 do not include a parking brake unit and thus the wear of the friction linings of these vehicle brakes 110 cannot be measured as per step 118 of the method according to FIGS. 2 and 3.

Thus, determining the wear according to step 124 involves an estimation of wear of the friction lining of the further vehicle brake 110 based on empirical values. For example, it may be known that a wear of a friction lining of a vehicle brake 110 of the front axis 102 is connected linearly with a wear of the friction lining of the vehicle brake 10 of the rear axis 104, so that the second wear value V2 of the vehicle brake 10 can be multiplied by a predetermined factor to obtain the fourth wear value V4 of the vehicle brake 110. Also, further (possibly more complex) mathematical estimation methods or formulas are conceivable, which allow a reliable estimation of the wear of the further vehicle brake 110 based on the second wear value V2. Here, for example, other factors can be considered, e. g. the (electronic) brake force distribution, the loading condition of the vehicle 100 and/or other relevant parameters, such as the operational history of the vehicle.

The fourth wear value V4 can be stored (as well as the second wear value V2) in the memory of the control unit 112 or be used to provide the driver of the vehicle 100 with information on the wear of the friction linings.

Figure 4:
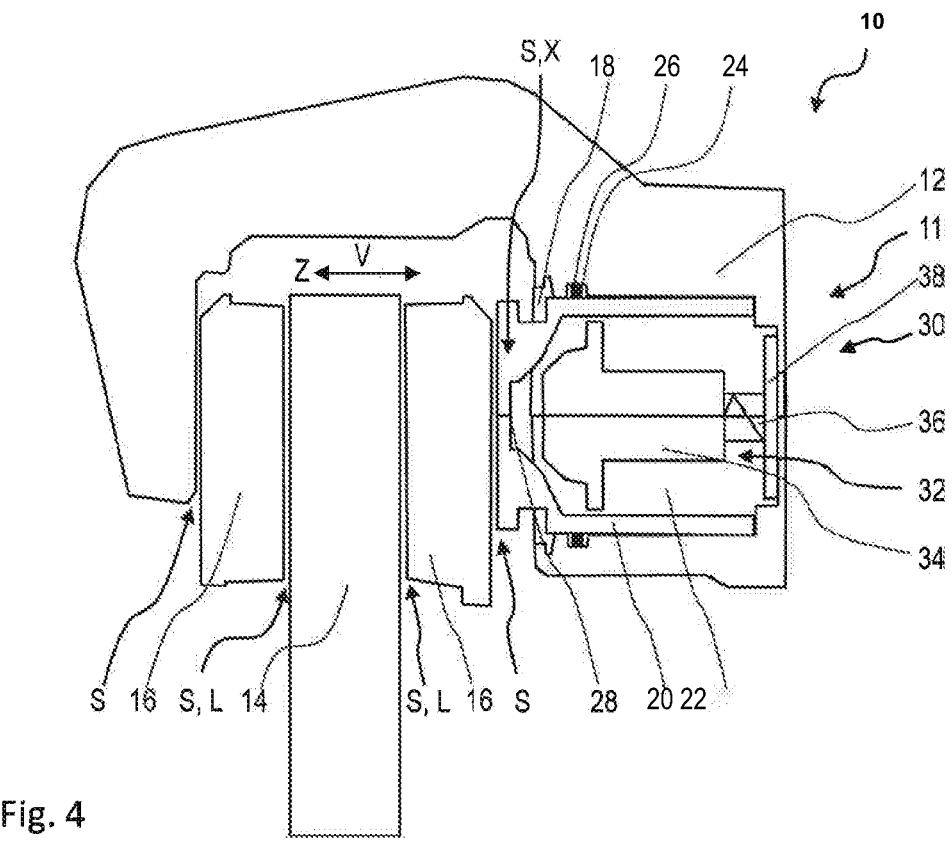
FIG. 4 is a schematic view of a vehicle brake to implement a method for operating a vehicle brake system according to the first or the second embodiment.

FIG. 4 shows a vehicle brake for performing the method according to the first or second embodiment described above, and is generally identified with 10. The vehicle brake 10 is constructed as a well-known floating-caliper brake in mechanical terms, wherein only selected components of the vehicle brake 10 are shown. The vehicle brakes 10, which are shown in FIG. 4 and have been discussed above, can be arranged according to the vehicle brake 10 of FIG. 4.

In particular, it is discussed below how the measurement of wear of the friction lining according to step 118 of FIG. 2 and the FIG. 3 can be carried out. Accordingly, the vehicle brake 10 comprises a brake housing 12 in the form of a known brake caliper. Furthermore, a rotationally fixed brake disc 14 is provided, which is coupled to a vehicle wheel (please see the vehicle wheels 108 of the vehicle 100 of FIG. 1). The friction linings 16 are opposite on both sides of the brake disc 14, which can be brought into contact against the brake disc 14 to obtain a braking force. For this purpose, a service brake 11 of the vehicle brake 10 comprises a displaceable actuating piston 20, which is received into a bore 18 in the brake housing 12. The actuating piston is designed as a hollow piston, and together with bore 18 it is delimiting a hydraulic chamber 22. As the hydraulic fluid is introduced and released in the hydraulic chamber 22, the hydraulic pressure varies in the chamber 22, and the actuating piston is moved along a displacement axis V in a generally known manner. A movement along the displacement axis V in FIG. 4 to the left, corresponds to a movement in a clamping direction Z. Overall, the friction linings 16 can be brought into contact against the brake disc 14 to obtain a braking force and when the hydraulic pressure decays again the friction linings are released, in order to ensure the operating brake function.

To achieve the desired return movement of the actuating piston 20 to its original position after the hydraulic pressure is released, the vehicle brake 12 further comprises a seal 24, represented schematically. This is received into an outlet groove 26 of the bore 18 and is in contact against an outer wall of the actuating piston 20. The seal 24 operates in a generally known manner with a so-called "Rollback" function, which acts as a support to push the actuating piston 20 back into its initial position when the hydraulic pressure is released.

Furthermore, it can be seen in FIG. 4 that, to achieve the parking brake function, a parking brake unit 30 is received into the hydraulic chamber 22, which can also move along the displacement axis V. The parking brake unit 30 is designed in mechanical terms according to known solutions and comprises an actuator unit 32, which is designed as a nut/spindle arrangement. More specifically, the actuator unit 32 comprises a spindle nut 34, which is movable by rotation of a spindle 36 translationally along the displacement axis V. Here, the spindle nut 34 can also be brought into contact against a piston head 28, which is designed as the inner end wall region of the actuating piston 20, which is facing the spindle nut 34 and delimiting the hydraulic chamber 22.

The actuator unit 32 is further connected via a coupling area 38 to the brake housing 12, wherein an electromotive drive or transmission unit, not separately presented, is flange-mounted in the coupling area 38, from the outside of the brake housing 12. The electric motor drive unit powers the spindle 36 rotationally to achieve the desired displacement movement of the spindle nut 34 along the axis V.

In FIG. 4, the existing gap sizes S are also registered in relation to a non-actuated service brake function and parking braking function. These gap sizes need to be bridged to achieve a braking force. These relate to (in FIG. 4 from left to right): a gap S between the brake housing 12 and the left friction lining 16 shown in FIG. 4, a gap S between this left friction lining 16 and the brake disc 14, a gap S between the right friction lining 16 shown in FIG. 4 and the brake disc 14 and a gap S between the actuating piston 20 and the right friction lining. The parking brake unit 30 must also overcome a gap S between the spindle nut 34 and the piston head 28 of the actuating piston 20 for generating braking forces.

The gaps S between the friction linings 16 and the disc brake 14 are generally referred to as "clearance" or "brake clearance", that is why these gaps are also provided with the reference sign L. The clearance L should have a predetermined minimum value in order to avoid residual torques in the sense of unwanted contact of the friction linings 16 with the brake disc 14 at an non-actuated vehicle brake 10.

The gap S between the spindle nut 34 and the piston head 28 of the actuating piston 20 refers to the safety margin, that is why this gap S is additionally provided with the reference sign X. The safety margin X has a predetermined minimum value for reasons of system safety, to ensure a proper operation of the service brake function in the event of non-operation of the parking brake function.

In an ordinary driver-controlled service brake, a hydraulic pressure is formed in the hydraulic chamber 22 and the actuating piston 20 is moved into an operating position to generate the braking force along the damping direction Z. In this case, while the piston is in contact against the right friction lining 16, is pushed against the brake disc 14 clamping down the vehicle brake 10 in a known manner as per a floating caliper design. Here, all the gap sizes S including the air clearance L are bridged, with the exception of the safety distance X between the spindle nut 34 and the piston head 28. When the braking force is released, the actuating piston 20, as a result of reducing the hydraulic pressure and via "Rollback" support of the seal 24, moves against the clamping direction Z, and thus, the first bridged gap sizes S, L are returned to the initial position. The parking brake unit 30 can be generally activated in the presence or absence of a hydraulic pressure to move the actuating piston 20 into its operating position and/or to mechanically fix it there. For this purpose, the spindle nut 34 is moved in the manner described above along the axis V and is supported (at least with a movement in the clamping direction Z) against the piston head 28.

For the method according to the present embodiment, it is provided that an activation of the parking brake unit 30 takes place without hydraulic pressure being applied previously, that is, the vehicle brake 10 is not generally supplied with hydraulic pressure. The individual method steps are explained below with reference to FIGS. 5-8.

Figure 5:
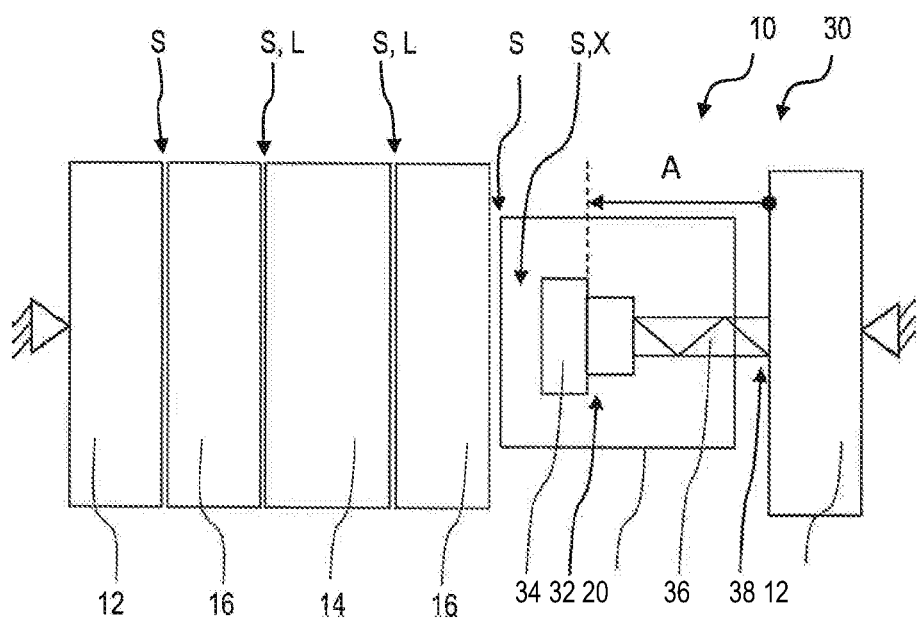
FIG. 5 is a first schematic view for explaining the measurement of wear according to the first or the second embodiment while clamping or applying the parking brake unit.

In FIG. 5, the vehicle brake 10 of FIG. 4 is shown in a simplified schematic representation. Again, the brake housing 12 can be recognized, which is shown as a block-shaped fixed bearing. Furthermore, the representation of block-shaped friction linings 16 and the brake disc 14 can be viewed. Finally, the actuation piston 20 is shown, which receives the actuator unit 32 of the parking brake unit 30. The actuator unit 32 again comprises the spindle nut 34 and spindle 36, the latter being coupled to the brake housing 12 in a coupling area 38. Analogously to FIG. 4, an electromotive drive unit of the parking brake unit 30 is not shown separately.

In FIG. 5, the vehicle brake 10 is once again in the general non-actuated state of FIG. 4, so that the above-described gap sizes S are adjusted to the initial position, including the clearance L between brake disc 14 and the friction lining 16 and the safety distance X between the spindle nut 34 and the piston head 28 of the actuating piston 20. Accordingly, the actuator unit 32 is in an inactive braking starting position. In this state, the spindle nut 34 is located at a distance A from the coupling area 38 to the brake housing 12.

Figure 6:
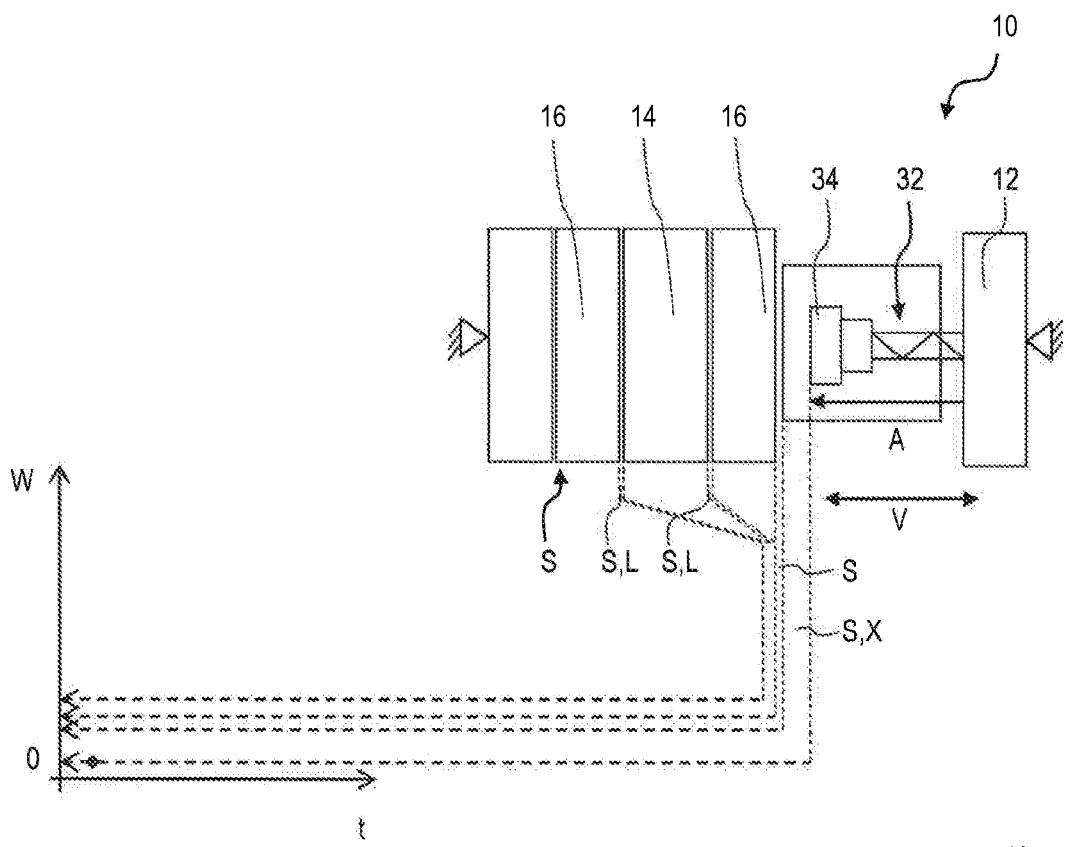
FIG. 6 is a second schematic view for explaining the measurement of wear according to the first or the second embodiment while damping or applying the parking brake unit.
Figure 7:
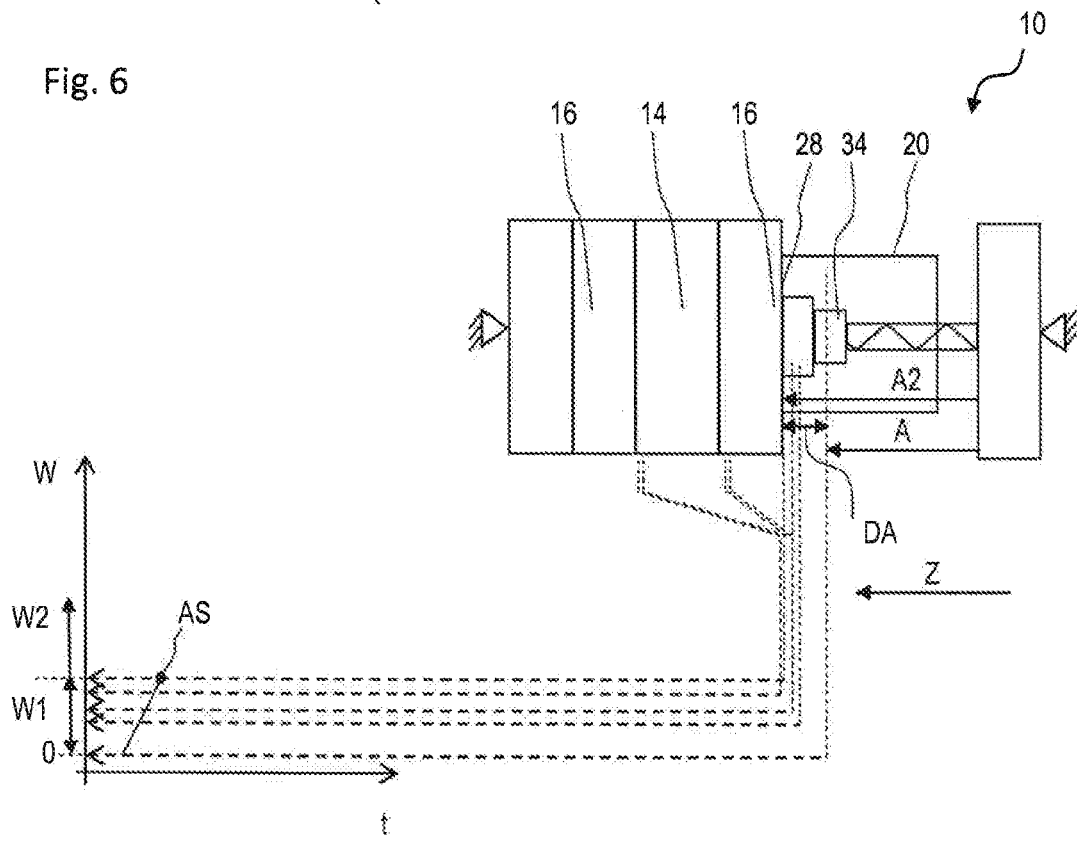
FIG. 7 is a third schematic view for explaining the measurement of wear according to the first or the second embodiment while clamping or applying the parking brake unit.

FIGS. 6 and 7 show the activation of the parking brake unit 30 and movement along a first and second motion range W1, W2, in order to determine the location of the support point AS. In this case, the representations of the vehicle brake 10 generally correspond to the representation of FIG. 5. In addition, the course of the spindle nut path w is registered over time t, wherein separate movement points, gap measurements points and bridging points along the spindle nut path W are indicated with dotted lines. Please note that for illustration purposes the starting or 0-position of the spindle nut is slightly offset 34 with respect to the time axis t.

FIG. 6 shows again the initial state with the a non-actuated vehicle brake 10 according to FIGS. 4 and 5. Consequently, the relevant gap sizes S including the clearance L between the friction linings 16 and the brake disc 14 and the safety distance X between the spindle nut 34 and the piston head 28 of the actuating piston 20 can be recognized again. In FIG. 6, the parking brake unit 30 is positioned in its first motion range, in which it generates no braking forces, and the spindle nut 34 of the actuator unit 32 is located at the above-described distance A to the brake housing 12. From this position a displacement of the spindle nut 34 takes place along the axis V into the position shown in FIG. 7, in which all the gap sizes S are bridged for the first time. To illustrate this process, in FIG. 7 the same dotted lines are registered at the same positions as in FIG. 6.

In detail, it may be seen in FIG. 7 that the spindle nut 34 due to a spindle rotation has covered a spindle nut path W1, and thus, it is located at a greater distance A2 from the brake housing 12 than in the case of FIG. 6 (please see distance change DA). It is not shown separately that the spindle nut 34, during movement between the states of FIGS. 6 and 7, gets first into contact against the piston head 28 of the actuating piston 20, which is as well displaced in the direction of the brake disc 14. In other words, the safety distance X is first overcome between the spindle nut 34 and the piston head 28, where the further gap S is overcome between the actuating piston 20 and the opposite (in FIG. 6 to the right) friction lining 16. In a slight further movement of the spindle nut 34 all gaps S including the clearance L are finally bridged, reaching the state shown in FIG. 7. In this case, the curve of a motor current of the parking brake unit 30 is continuously monitored as a relevant operating parameter.

In such state, the movement of the parking brake unit 30 or of the spindle nut 34 generates no braking forces. In other words, the spindle nut path W1 corresponds to a first motion range of the parking brake unit 30 in which no braking forces are generated. When reaching the state of FIG. 7 each further movement is directed in a clamping direction Z to the left as in FIG. 7, in order to produce and thus modify the braking forces, as shown below in FIG. 8. This further movement of the spindle nut 34 takes place when the parking brake unit 30 covers a second motion range W2, actively generating braking forces. Ultimately, this refers to the state shown in FIG. 7, that is, the transition state from the first to the second motion range of the parking brake unit 30, consequently, the support point AS is reached.

Figure 8:
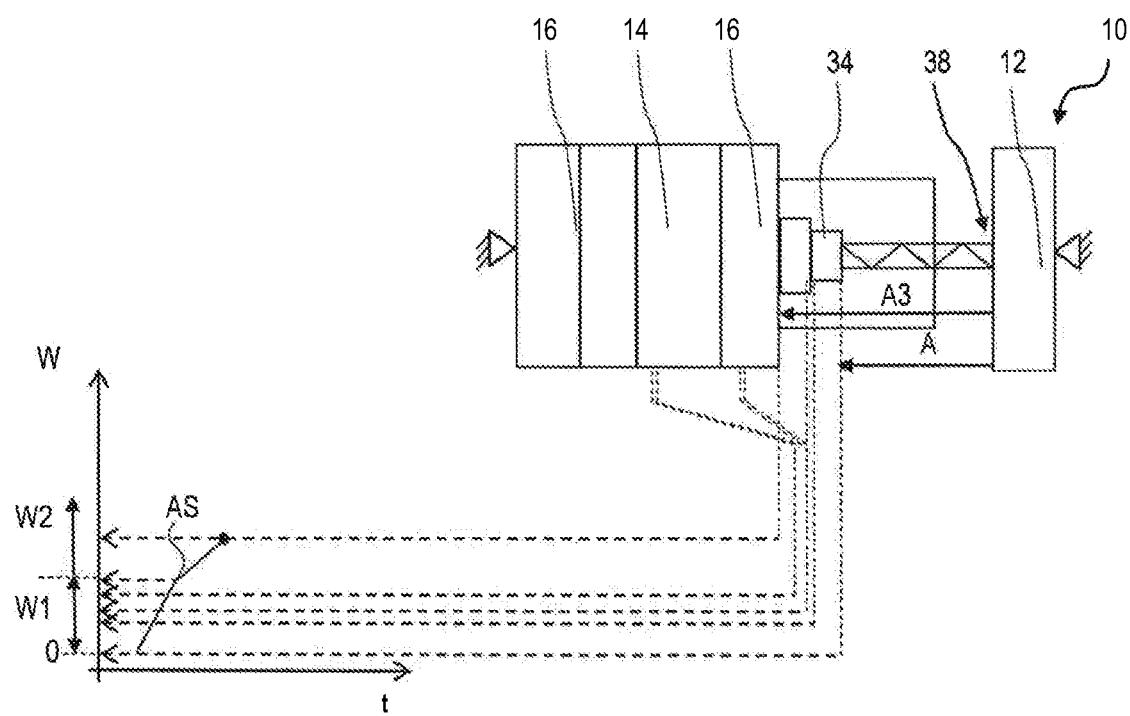
FIG. 8 is a fourth schematic view for explaining the measurement of wear according to the first or the second embodiment while damping or applying the parking brake unit.

FIG. 8 shows a state in which the spindle nut 34 is further moved into the second motion range W2 of the parking brake unit 30, and thus presses the friction lining 16 while generating the corresponding braking forces to the brake disc 14. Here, with respect to the previous figures the spindle nut 34 is arranged at a greater distance A3, relative to the brake housing 12. As can be seen from the course of the spindle nut path W in FIG. 8, the increase of the spindle nut path W in the second motion range W2 takes place with a lower gradient. The reason for this is the increasing resistance of the components of the vehicle brake 10 against the clamping movement of the spindle nut 34, especially because of the elasticity or stiffness of the friction lining 16 and the brake housing 12.

This increasing resistance is reflected in a significant rise of the motor current of the parking brake unit 30 and can be, accordingly, detected by a control system of the brake 10. More specifically, reaching the support point AS is recognized in terms of the control system by the fact that, due to the lack of generation of braking forces, the motor current of the parking brake unit 30 takes place through the first motion range W1 in a basically constant manner or with a slight gradient. However, after reaching the support point AS and moving into the second motion range W2, the motor current increases significantly and runs with a much larger gradient. Thus, as soon as the state shown in FIG. 8 is reached, the position of the support point AS can be, so to speak, determined retrospectively, that is, the support point can be determined as the point at which the first significant change occurs in the motor current curve. In the same sense, the rotational speed of the electric motor drive unit can also be analyzed. Basically the rotational speed takes place in a continuous way until reaching the support point and decreases sharply when the clamping force is initiated.

In the case shown, the position of the support point AS is stored as a spindle nut path W or W1 in the control unit 112 of the vehicle brake system. It is also conceivable to select the brake housing 12 and the coupling area 38 as a reference point and to store the position of the support point as the corresponding distance A2 of the spindle nut 34 to the brake housing 12 (please see FIG. 7). Similarly, based on the initial positions of FIGS. 4 to 6, the original distance A can be selected as a reference point, and the position of the support point AS can be defined as a relative distance between the original distance A and the distance A2 of FIG. 7.

In dependence upon how the position of the support point AS is stored in the control unit 112, by the above-described method it is possible to precisely determine the second wear value by performing a measurement. For example, the above-described method can be carried out in the new condition of the vehicle 100 or immediately after a change of the friction lining 16, so that a (original) position of the support point AS in the non-worn condition of the friction lining 16 is known. Now, according to step 118, if the position of the support point AS is determined again, the difference between the original position of the support point and the position of the support point at the time of measurement (step 118) can be identified as a second wear value V2.

In summary, the technique described herein allows, on the one hand, a precise determination of a (second) wear value V2 of a friction lining 16 of a vehicle brake 10 by performing a measurement (step 118). However, this precise measurement is carried out only when a prior estimation (step 114) indicates that the wear of the friction lining 16 has already reached a critical value. This prior estimation and the subsequent assessment can often prevent an unnecessary and costly measurement of the wear value.

What is claimed is:

1. A method for operating a vehicle brake system of a vehicle, wherein the vehicle brake system comprises at least one vehicle brake, wherein the vehicle brake includes a service brake having an actuating piston which, in order to generate a braking force by the action of a hydraulic pressure, is movable into an operating position, in which the actuating piston presses a friction lining against a rotating brake disc, and wherein the vehicle brake further comprises a parking brake unit, that is designed to apply a braking force acting on the brake disc, characterized in that it is supported against the actuating piston to press the friction lining against the brake disc, wherein the method comprises the following steps:
    to determine a first wear value that indicates wear of the friction lining of the vehicle brake, by taking into account at least one parameter of the operational history of the vehicle,
    in dependence upon whether the first wear value meets a predetermined criterion, to perform a measurement of wear of the friction lining by moving the parking brake unit and recording the curve of an operating parameter of the parking brake unit while moving, and
    to determine, based on the measurement, a second wear value, which indicates wear of the friction lining of the vehicle brake.

2. The method according to claim 1, wherein the predetermined criterion of the first wear value includes an assessment as to whether the first wear value is above a predetermined threshold.

3. The method according to claim 1, further comprising the steps of:
    determining a third wear value indicating wear of the friction lining of the vehicle brake by identifying an overall elasticity of the vehicle brake, and
    in dependence upon whether the third wear value meets a predetermined criterion, performing the measurement of wear.

4. The method according to claim 3, wherein the predetermined criterion of the third wear value includes an assessment as to whether the third wear value is above a predetermined threshold.

5. The method according to claim 4, wherein the step of determining the third wear value is carried out after the step of determining the first wear value, in dependence upon whether the first wear value meets its predetermined criterion.

6. The method according to claim 1, further comprising the step of determining at least one fourth wear value of a further vehicle brake of the vehicle brake system based on the second wear value of the vehicle brake.

7. The method according to claim 6, wherein the further vehicle brake is a vehicle brake without a parking brake unit.

8. The method according to claim 1, wherein performing the wear measurement comprises determining a position of a support point (AS) of the parking brake unit by detecting a change in the operating parameter.

9. The method according to claim 1 wherein the parking brake unit comprises an electric motor drive unit and an actuator unit interacting with the actuating piston, wherein the electric motor drive unit is designed to move the actuator unit in order to press the friction lining against the brake disc, and wherein the operating parameter of the parking brake unit comprises a motor current of the electric motor drive unit and/or a rotational speed of the electric motor drive unit.

10. The method according to claim 1 wherein the step of determining the first wear value comprises a calculation based on a mathematical model and the at least one parameter relating to the vehicle's operational history is taken into account in the mathematical model.

11. The method according to claim 1, wherein the parameter relating to the vehicle's operational history comprises at least one of the following parameters:

Total sum of the distance traveled by the vehicle;
The sum of the distance traveled by the vehicle since the last change of the friction lining;
Time elapsed since the initial operation of the vehicle braking system;
Time elapsed since the last change of the friction lining;
Vehicle operating period since the initial operation of the vehicle;
Vehicle operating period since the last change of the friction lining;
Number of previous braking operations;
Number of braking operations since the last change of the friction lining;
Applied force of past braking operations; and
Environmental conditions of the vehicle.

12. The method according to claim 11 wherein the environmental conditions of the vehicle includes at least the outside temperature.

13. The method according to claim 1, further comprising the step of providing notice to the driver of the vehicle, who will be advised that changing a brake lining is required which is dependent upon whether the second wear value meets a predetermined criterion.

14. The method according to claim 1 wherein the at least one parameter of the operational history of the vehicle is stored in a memory of a control unit of the vehicle brake system.

* * * * *